United States Patent [19]

Jusaitis et al.

[11] Patent Number: 4,859,348

[45] Date of Patent: Aug. 22, 1989

[54] METHOD AND DEVICE FOR FILTERING OILS FROM INFUSION BEVERAGES

[75] Inventors: Walter Jusaitis, Chesterfield; William W. Matthews, Imperial, both of Mo.

[73] Assignee: National Fluid Separators, Inc., St. Louis, Mo.

[21] Appl. No.: 218,473

[22] Filed: Jul. 6, 1988

Related U.S. Application Data

[63] Continuation of Ser. No. 946,887, Dec. 29, 1986, abandoned.

[51] Int. Cl.$^4$ .................. B01D 17/02; B01D 23/28
[52] U.S. Cl. .................. 210/799; 210/470; 210/474; 210/477; 210/481; 210/495; 210/497.2; 210/DIG. 5
[58] Field of Search .............. 210/799, 469, 474, 477, 210/478, 479, 480, 481, 482, 908, D5, 497.01, 497.3, 495, 470, 497.2; 426/44, 45, 77, 82, 84, 433; 55/477; 99/295, 306, 412

[56] References Cited

U.S. PATENT DOCUMENTS

| | | | |
|---|---|---|---|
| 2,546,874 | 3/1951 | Siegrist | 210/477 |
| 3,616,934 | 11/1971 | Ehrlich | 210/474 |
| 3,651,947 | 3/1972 | Schullhamer | 210/474 |
| 4,052,319 | 10/1977 | Friedman | 210/474 |
| 4,176,588 | 12/1979 | Baron | 210/469 |
| 4,416,482 | 11/1983 | Kerres | 210/799 |

Primary Examiner—Richard V. Fisher
Assistant Examiner—Wanda L. Millard
Attorney, Agent, or Firm—Haverstock, Garrett & Roberts

[57] ABSTRACT

A filter device adapted to separate immiscible liquids in beverages such as coffee or tea and other consumable material such as soups and gravies is so designed whereby the beverage or other consumable material passes through a special prewetted filter cloth member and the oils or other immiscible organic liquids contained in the consumable material are coalesced and retained upon the surface of the filter cloth member. The special filter cloth member is formed of synthetic fibers having a low moisture regain, provided with a multiplicity of fine interstitial openings and is napped on the upper surface.

11 Claims, 4 Drawing Sheets

METHOD AND DEVICE FOR FILTERING OILS FROM INFUSION BEVERAGES

This is a continuation of co-pending application Ser. No. 946,887 filed on Dec, 29, 1986, now abandoned.

The present invention relates to a filter device adapted to separate the immiscible liquids in beverages, such as tea and coffee and in certain other consumable materials such as soups and gravies. The filter device is so designed whereby the beverage or other consumable material is passed through a special prewetted filter cloth member and the oils or other immiscible organic materials contained in such beverage or consumable material are coalesced on the surface of the filter cloth member.

BACKGROUND OF THE INVENTION

Green coffee beans are well known to contain a multiplicity of organic compounds. Most of such compounds are not reduced by the process of roasting the coffee beans prior to grinding same for the preparation of coffee. In addition to the various forms of celluloses and carbohydrates, which constitute the major constituents in the natural coffee beans, there also occur in such green coffee beans about 12 to 17 percent by weight on a dry weight basis of a mixture of oils which are fatty acids, including myristic, palmitic, stearic, oleic, linoleic and others. These coffee bean oils, which are carried over by the hot water in which the ground coffee beans are brewed are undesirable in the final beverage for several reasons. First, the oils contribute to the rapid staleness of brewed coffee when kept warm in a container over periods of time since they rapidly develop rancidity and odor. Secondly, such oils are undesired by many consumers because of the possible relation to the development of elevated serum cholesterol levels in coffee drinkers. Therefore, the removal or reduction of the presence of such coffee vegetable oils in the brewed coffee beverage has been long desired.

In addition to the presence of naturally occuring coffee oils, decaffeinated coffee, an increasingly popular form of the coffee beverage, has most generally been decaffeinated by the use of chlorinated hydrocarbon solvents to remove the caffeine alkaloid. After such removal, traces of the chlorinated hydrocarbon solvents remain adhered to the coffee beans or ground coffee and are likewise carried over into the brewed beverage and into instant decaffeinated coffee when prepared from recrystallized or frozen coffee crystals. Removal of the traces of chlorinated hydrocarbons contained in such decaffeinated coffee has also been desired.

The present invention is particularly adaptable for use in removing coffee bean oils from brewed coffee and for removing the traces of hydrocarbon solvents, including chlorinated hydrocarbon solvents, from brewed decaffeinated coffee. Attempts have been made to improve coffee filters in the past, but most have been directed toward removing the ground fines and the like and none has been adapted to remove the coffee bean oils and chlorinated and non-chlorinated hydrocarbons from processed or brewed coffee, see for example, Schollhamer U.S. Pat. No. 3,651,947; Schleyer U.S. Pat. No. 2,224,409; Jepson U.S. Pat. No. 2,864,504; Oakley U.S. Pat. No. 3,266,411: Bartolome U.S. Pat. No. 4,080,299; and Nicholson U.S. Pat. No. 4,497,709.

The process of removing the oils and hydrocarbons from such beverages and other consumable fluids involves the separation of immiscible liquids. The separation of water from organic fluids in which it is not miscible, such as oils, by the use of coalescers is known. For example, it is known that there exists an interfacial tension between immiscible liquids such as water and oil. It is also known that membranes containing very fine interstitial openings when wetted by one of two immiscible liquids will preferentially allow the passage through the membrane of the liquid with which the membrane is wetted, and will reject, or tend to prevent passage of, the other liquid with an opposing force that is proportional to the interfacial tension of the liquids and inversely proportional to the size of the interstitial openings. Several devices have been constructed to utilize this phenomenon of membranes with fine interstitial openings, see for example, Walker U.S. Pat. No. 4,430,222, but none has addressed the problem of removing oils from processed consumables such as beverages. Also, none has utilized the phenomenon discussed above in conjunction with the known phenomenon of the coalescing effects of closely packed, very fine fibers or fibrils, such as displayed by a napped fabric in order to separate oils and/or hydrocarbons in very low concentrations in water or other aqueous solutions. On the contrary, these prior art devices have generally been directed toward the separation of small concentrations of water from oily or hydrocarbonaceous liquids such as gasoline, fuel oil and the like.

SUMMARY OF THE INVENTION

The present invention is particularly designed to remove the oils and other organic materials which are immiscible with water from beverages and certain other consumable liquids. It includes a special napped fabric member which is preferrably suitably framed or mounted and positioned extending across a support member. The nature of the nap of the fabric member and size of the interstitial apertures therein are important and are such that when the fabric member is wetted with water (or brewed coffee or tea), the oils and other hydrocarbons are retained thereon and coalesced, while the processed beverages or consumable liquid materials are permitted to pass therethrough. The use of the principle of the coalescing effect of a mass of very fine fibers or fibrils on the surface of a napped, i.e. brushed and sheared fabric, in combination with the principle of the rejection of the immiscible liquids demonstrating interfacial tension with the predominant water or aqueous solution by a very fine mesh or fabric with fine interstitial openings, when such mesh or fabric membrane has been previously wetted with water, has been found to be particularly effective for coalescing and retaining coffee bean oils and other immiscible hydrocarbons from aqueous based beverages and other dilute aqueous liquid compositions such as thin soups and the like.

For utilization in removing coffee bean oils from brewed coffee, particularly in drip type coffee makers, the support member for the napped fabric member may have several different forms including having inner and outer interfitting ring members which may be circular, with the inner ring member pressed into the outer ring member with the napped fabric member therebetween. The napped fabric then extends across and between the ring members and is retained therebetween. The filter or coalescer device can then be disposed in a filter support member of a drip type coffee maker or the like along with and beneath the usual coffee holding filter member, such as a paper filter, with the proper amount of coffee grounds contained therein. Thus, the coffee brewed from the coffee grounds by means of added water passes first through the coffee grounds and the paper filter holding them and then to and through the special napped fabric member such that the coffee bean oils in the brewed coffee are coalesced upon the upper napped surface thereof while the brewed coffee passes through and into a coffee holding pot. Likewise, in preparing brewed decaffeinated coffee the same positioning and utilization of the filter device of the present invention is used such that any traces of hydrocarbons or chlorinated hydrocarbons present as the result of decaffeination treatment of the coffee beans or coffee grounds are also coalesced and retained along with the coffee bean oils from the decaffeinated coffee grounds on the upper napped surface of the cloth filter member. Furthermore, when preparing a pot of instant coffee, either regular or decaffeinated, the same or a different embodiment of the present filter or coalescer device can be used which will likewise coalesce and retain on its surface any traces of the hydrocarbons, chlorinated hydrocarbons and coffee bean oils present in the brewed instant coffee.

DETAILED DESCRIPTION OF PREFERRED EMBODIMENTS

Figure 1:
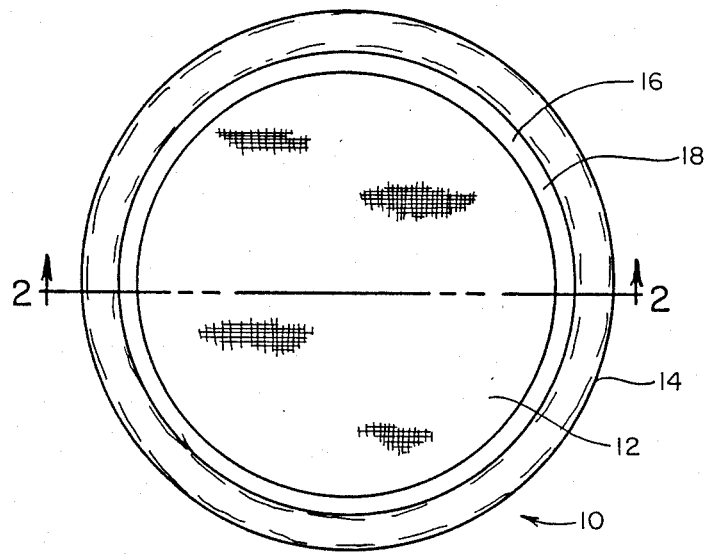
FIG. 1 is a top plan view of one embodiment of a filter or coalescer device constructed according to the teachings of the present invention.
Figure 2:
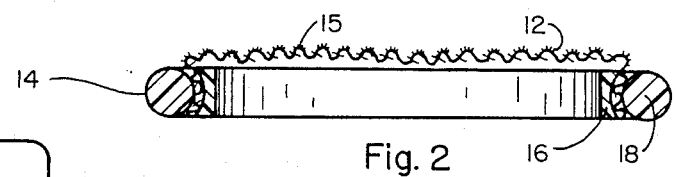
FIG. 2 is a cross-sectional view taken along line 2—2 of FIG. 1.

Referring to the drawings more particularly by reference numbers, wherein like numerals indicate like elements, there is shown in FIGS. 1 and 2 a filter or coalescer device 10 constructed according to the teachings of the present invention. The filter or coalescer device 10 includes a fabric filter member 12 formed of a special napped fabric material which is framed and positioned extending across support structure 14 with the nap 15 faced upwardly. The support structure 14 includes cooperating inner ring 16 and outer ring 18, the inner ring 16 being pressed into the outer ring 18 with the peripheral portion of the fabric filter member 12 held therebetween. The fabric filter member 12 therefore extends across and between the ring members 16 and 18 and is retained thereby. The support structure 14 can be constructed in other ways also and can be of any desired size and shape depending on how and where it will be used in various applications.

The fabric filter member 12 is so constructed that when wetted with a substance such as water, a processed beverage or other consumable aqueous liquid solution, such as brewed coffee, the wetting substance, i.e. water or aqueous solution, can pass therethrough while the oils or hydrocarbons contained in the processed consumable beverage or aqueous liquid, such as coffee bean oils, are coalesced and trapped or retained on the napped surface 15 of fabric filter member 12. The purely aqueous solution from which the oils or hydrocarbons are removed is allowed to pass therethrough. The construction of the fabric material used in the fabric filter member 12 is critical to the invention and includes a napped, i.e. brushed and sheared, fabric of a low moisture regain synthetic fiber such as nylon, whose fabric construction is such that when woven or otherwise formed it has a multiplicity of relatively fine interstitial openings, pores or apertures which are formed by and between the adjacent strands which form the member. The term "moisture regain" refers to the capacity of a filter or fabric to absorb moisture. Any low moisture regain synthetic fiber can be used, such as relatively small denier polyester, polyolefin, polyacrylic, or nylon fiber material. It has been found, however, that nylon functions particularly well since in its undyed state it is generally acceptable for food applications.

All fabrics, whether knitted, woven or nonwoven, possess a multiplicity of interstitial openings or pores formed by and between the constituent threads, yarns or filaments used in making the fabric. Those fabrics composed of relatively fine denier threads, yarns or filaments will contain a greater number of such interstitial openings than fabrics formed using relatively larger threads, yarns or filaments for a given square area of the fabric. For example, a finely woven fabric with approximately 100 threads per inch such as a percale will have about 99 openings per lineal inch and around 10,000 very small openings per square inch. Likewise, a knitted fabric with 50 courses per inch will have 49 openings per lineal inch and around 2500 openings per square inch of the knitted fabric. When such fabrics are produced from the generally hydrophobic synthetic fibers, which display a low moisture regain, such fabrics will act as a sieve or mesh to repel a selected immiscible liquid or liquids when the fabric is wetted with the liquid that is to be allowed to pass through. Such a phenomenon is disclosed in connection with wire screens coated with Teflon in U.S. Pat. No. 4,430,222 of Walker discussed hereinabove, but in that instance the wire screens are required to be at least as fine as 100 mesh, i.e. approximately 100 openings per lineal inch, in order to produce a useful repelling force for the undesired water droplets such as may be present in diesel fuel.

The present applicants have discovered that an entirely suitable fabric filter for use in the present invention is Raschel knit nylon tricot having about 44 courses per inch, which would approximate a wire sieve of No. 45 standard mesh, and which fabric would contain interstitial openings that are somewhat larger than the 100 mesh wire scren of the Walker patent. It was further discovered that when combined with the coalescing and retention abilities of the fine fiber nap, such as that of a napped fabric formed of fine denier multifilament face yarns, the ability of such a fabric to coalesce, collect and retain oils and hydrocarbons from aqueous liquids is greatly enhanced.

The fabric construction, which is brushed and sheared to produce a napped fabric on at least one surface suitable for use as the fabric filter member of the present filter device, can be any nappable material such as woven, knitted or nonwoven fabric. If a knitted fabric material is used, either a Raschel knit, a tricot knit, a tubular knit or some other knit fabric is suitable. Likewise, any nappable woven or non-woven fabric which can be brushed and sheared to produce a relatively short nap of very fine fibers or fibrils on the napped surface thereof is also desirable for such use. One fabric that has been found to be suitable is Raschel flat knit tricot fabric constructed of fine denier multifiber yarns in which one yarn is used as the backing yarn and another as the face yarn, wherein the face yarn is the only one intentionally subjected to napping by brushing and shearing. With this material all the short napped fibers or fibrils on the napped face of the knitted fabric are derived from the face yarns. This means that the several different yarns used can have different compositions of fibers by size and they can have either continuous filaments or staple fibers, if desired. This is because only the face yarn need be constructed of fine denier multifibers, since only the face yarns need be subjected to napping. Consequently, the backing yarn or yarns can be made of different size filaments or multifibers than the face yarn or yarns. Normally, however, both the backing and face yarns will be of the same or similar fiber composition.

Figure 3:
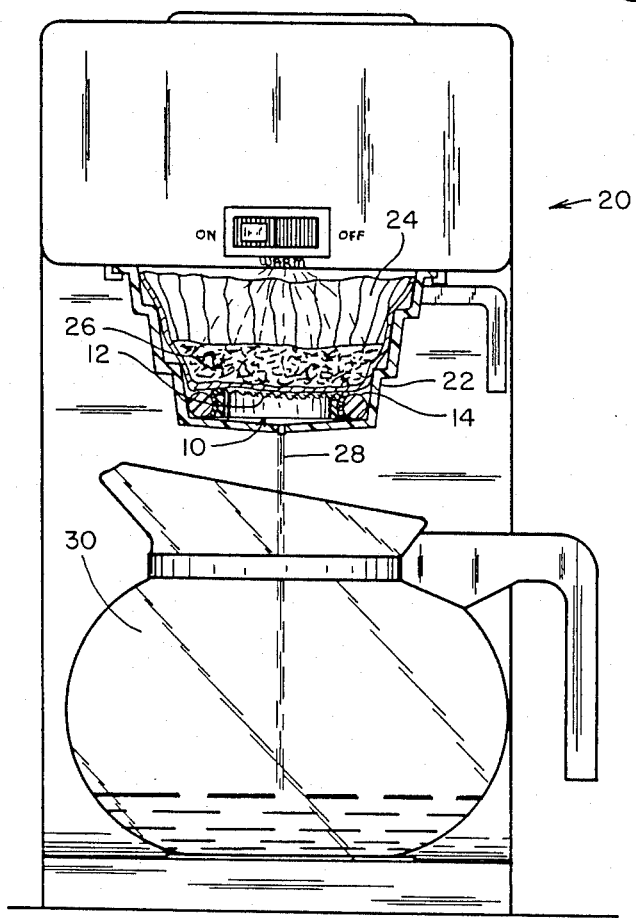
FIG. 3 is a side elevational view, partially in cross-section, of a drip type coffee maker showing the position therein of the filter device of FIG. 1.

As shown in FIG. 3, the filter device 10 of the present invention is particularly adapted to be utilized in conjunction with a drip type coffee maker 20 by positioning the filter device 10 in support member 22 of the coffee maker immediately underneath the usual paper filter 24 which holds the coffee grounds 26. The fabric filter member 12 extends across the support 14 and across the path through which all of the brewed coffee 28 flows as it flows into pot 30. In so doing the coffee bean oils are coalesced and retained on the upper napped surface 15 of the fabric filter member 12 while the brewed coffee passes through. For the filter 10 to best perform its filtering function it should be prewetted as with water before being used. The filter 10 can be mounted in a frame such as frame 14 or it may be mounted in other ways as will be described.

Figure 4:
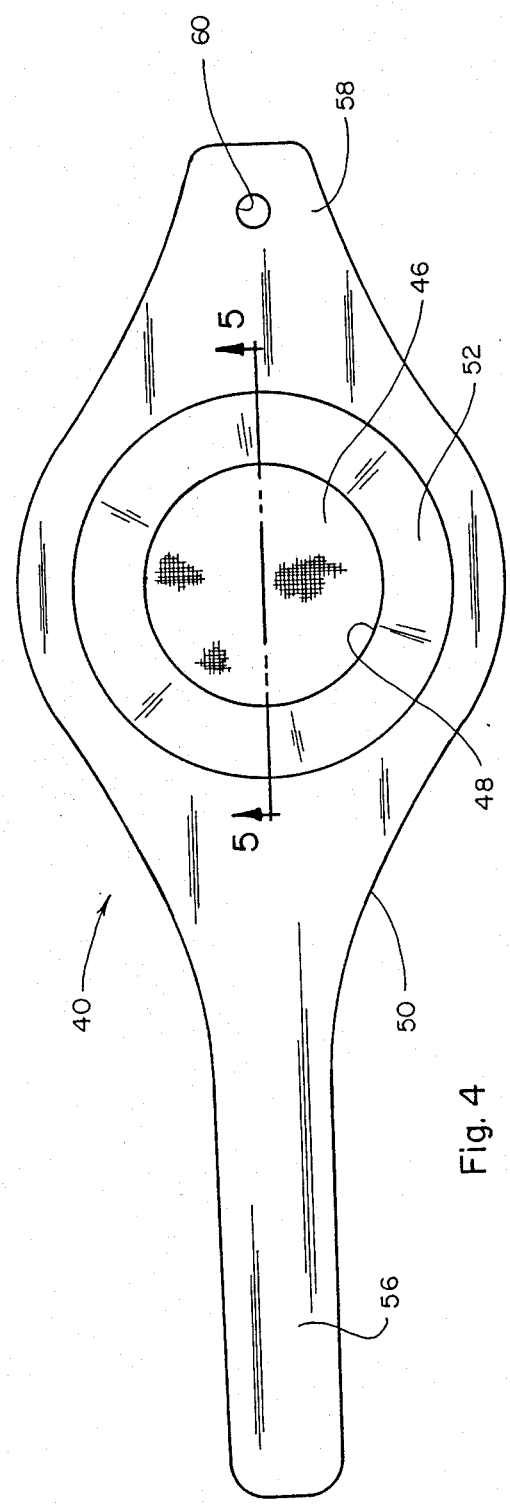
FIG. 4 is a top plan view of another embodiment of the subject filter or coalescer device for use when pouring coffee or some other liquid into a cup or other container.
Figure 5:
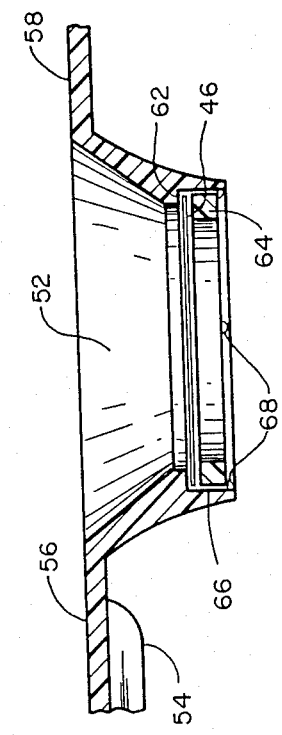
FIG. 5 is a fragmentary cross-sectional view taken on line 5—5 of FIG. 4.
Figure 6:
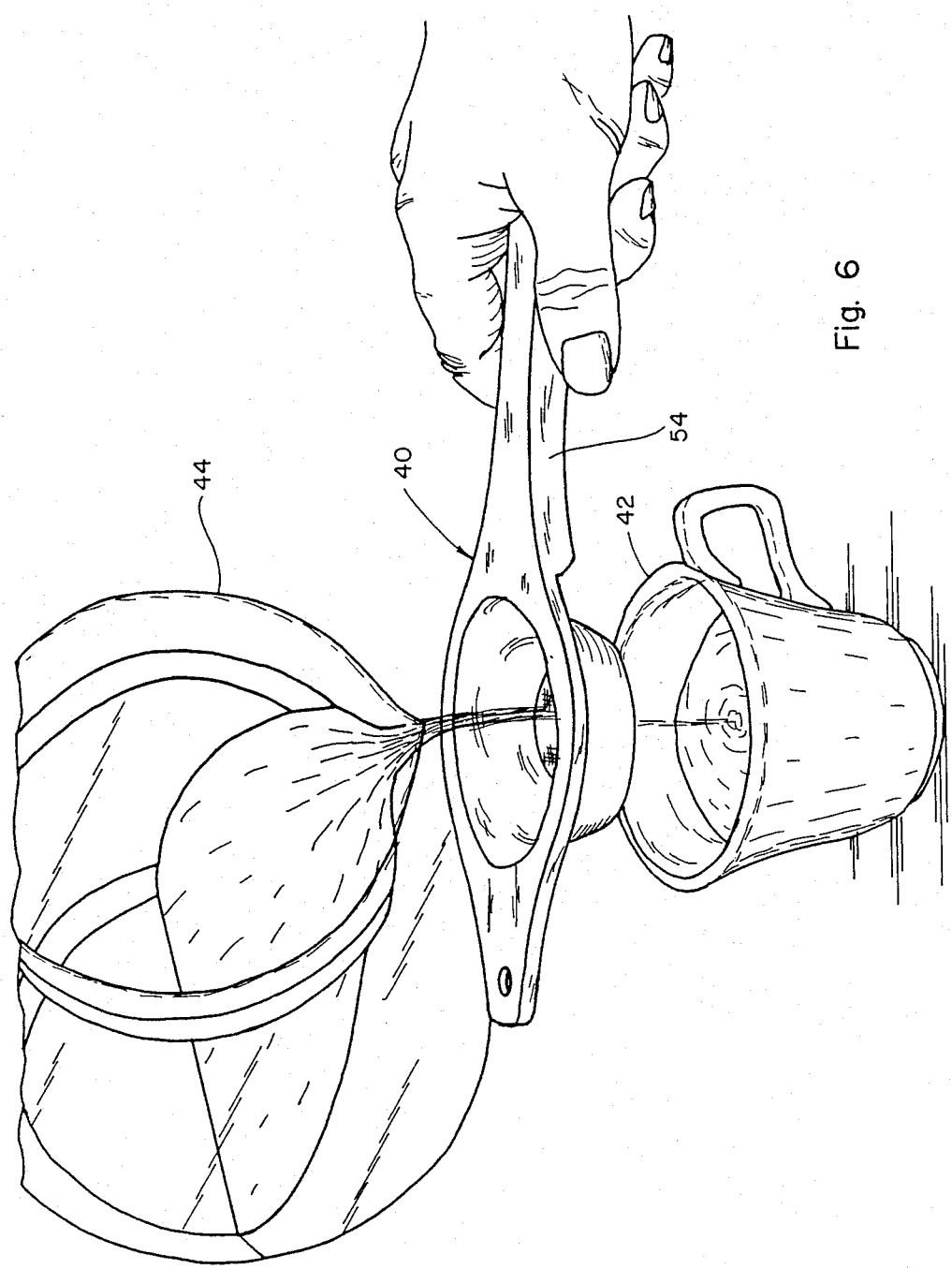
FIG. 6 is perspective view showing the device of FIG. 4 being used when pouring coffee into a cup.

An alternate embodiment 40 of the subject filter device is shown in FIGS. 4-6 and is used to filter or coalescer brewed coffee or other substance as it is poured into a container such as into coffee cup 42 from larger supply container 44. In this case fabric member 46 is mounted and held in place in an opening 48 in an elongated holder 50. The opening 48 is formed in a funnel like portion 52 of the holder 50. The holder 50 has an elongated handle portion 56 on one side thereof, and the opposite side is formed into an elongated portion 58 with a hole 60 therethrough for hanging the device on a nail or other suitable hanger. The funnel portion 52 is shown in FIG. 5 having a shoulder 62 against which the periphery of the fabric filter member 46 is positioned and the peripheral portion of the filter is clamped against the shoulder 62 when locking ring 64 is pressed or snapped into position in cylindrical space 66 formed in the bottom of the funnel portion 52. Spaced projections 68 on the wall of the cylindrical space 66 can be provided for this purpose. Alternatively, ring 64 can be heat welded or adhesively fixed to shoulder 62. If desired handle portion 56 can also be provided with a downturned side wall portion 54 for convenience in holding, as shown in FIG. 6.

Figure 8:
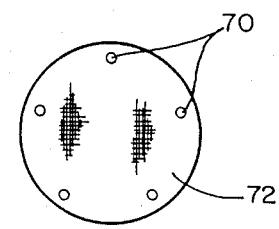
FIG. 8 is a top view of another modified form of the subject filter or coalescer member.
Figure 9:
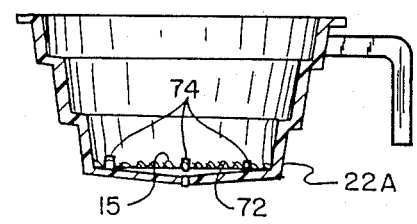
FIG. 9 is a cross-sectional view showing the modified filter coalescer member of FIG. 8 mounted for use in a drip type coffee maker.

With the construction shown in FIG. 5 the filter or coalescer member 46 may or may not be mounted in a frame. If it is not mounted in a frame, it may be necessary to provide an open gridwork or some other means to support one or both opposite sides of the filter member. Such an open grid can be formed in the interior of the locking ring 64. It is also possible to provide spaced openings such as openings 70 (FIG. 8) located near the periphery of the filter member 72 which openings cooperate with spaced posts or other projections 74 (FIG. 9) formed on the modified support 22A for the coffee maker 20. In this case the filter or coalescer member 72 may be snapped into position on the posts 74 in position extending across the opening in the support 22A through which the coffee passes. When the filter or coalescer has served its purpose, it can then be removed, rinsed or backflushed, discarded or replaced by another similar filter or coalescer as required. It is expected, however, that all forms of the present filters can be reused many times and therefor will need to be replaced relatively infrequently.

Figure 7:
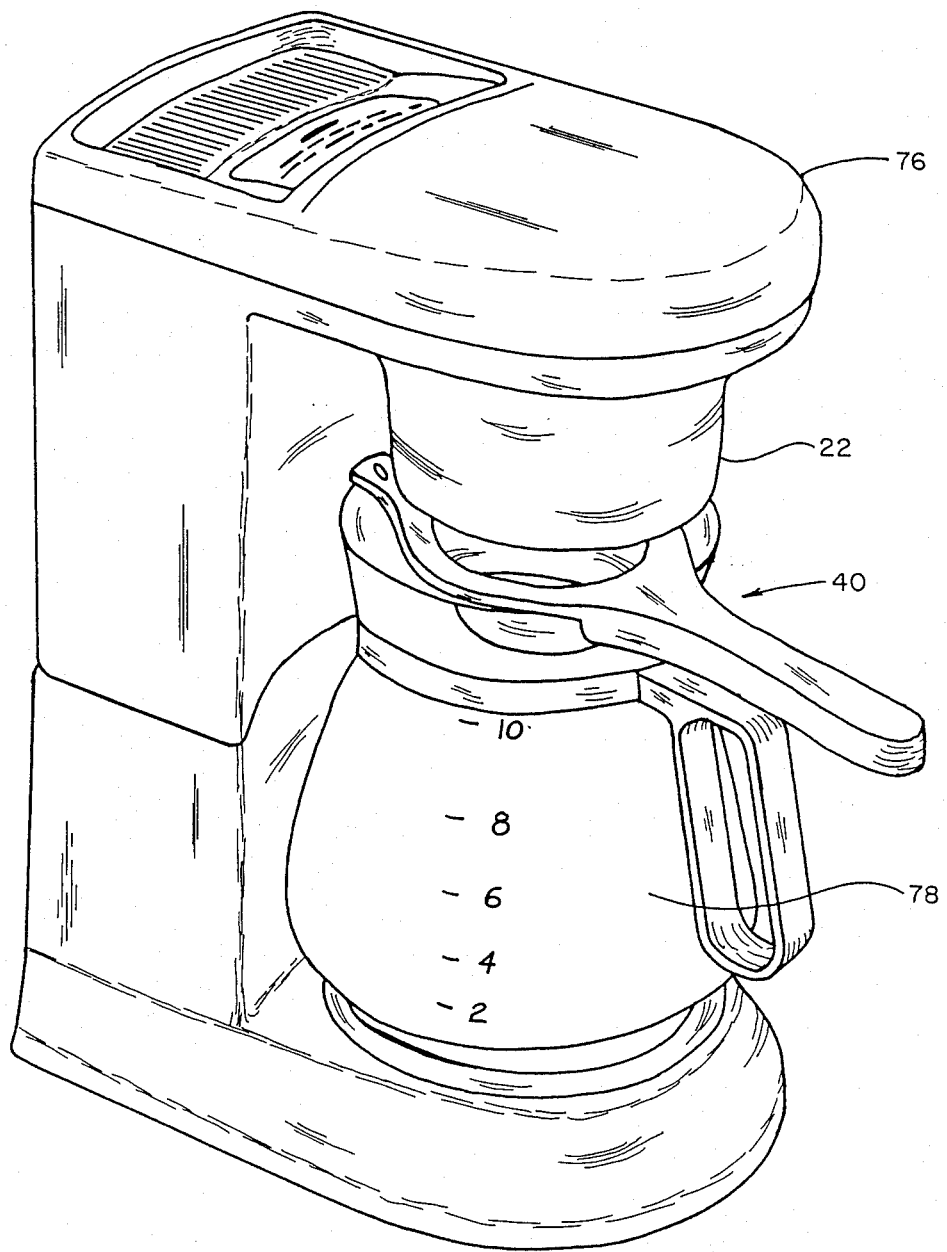
FIG. 7 is a perspective view showing the device of FIG. 4 being used in conjunction with a coffee maker.

In all the various embodiments of the subject filter or coalescer member, it is also contemplated that the filter or coalescer member may be shaped somewhat like a cone to make it so that the brewed coffee or other liquid being filtered will exit the filter or coalescer in a more or less concentrated stream. Such a construction may also better conform to the shape of the container in which it is positioned. The construction shown in FIGS. 4-6 can be used when filling individual cups with brewed coffee or tea, as shown in FIG. 6, and it can also be used in conjunction with a drip type coffee maker by holding it in the position shown in FIG. 7 between the housing 22 of the coffee maker 76 and the carafe 78. In all cases, it is important that the filter be positioned with its napped surface 15 as its upper surface so that the nap will operate to coalesce and trap the oils and other undesirable substances and retain them on the upper surface for later discarding. If the filter or coalescer is held upside down, even though prewetted, it will not properly trap the oils and other undesirable substances and the purpose for the filter will be lost.

All embodiments of the filter or coalescer member are relatively easy to back-flush to remove from the napped surface the retained coffee bean oils or other coalesced liquid hydrocarbons. Backflushing can be accomplished by holding the filter member in an upside down position under a water tap or the like. It has been found that the subject filter cloth material discussed hereinabove can be reused almost without limit so long as it is periodically backflushed, preferably with warm water, to remove the undesirable substances that have accumulated.

If desired, in all embodiments of the subject filter or coalescer member the support structure or structures for the fabric filter member can be formed of food grade nylon or polyester which materials are generally acceptable for use in contact with foodstuffs intended for consumption.

Thus, there has been shown and described a novel filter or coalescer device adapted to remove coffee oils and other undesirable hydrocarbons including chlorohydrocarbons from beverages and from certain other consumable materials, which filter device fulfills all the objects and advantages sought therefor. It will be apparent to those skilled in the art after reviewing this description, however, that many changes, modifications, variations, and other uses and applications for the subject filter devices in addition to those which been disclosed, are possible and contemplated, and all such changes, modifications, variations, and other uses and applications which do not depart from the spirit and scope of the invention are deemed to be covered by the invention which is limited only by the claims which follow.

What is claimed is:

1. In an assembly for collecting brewed coffee or tea in a receptacle as it is being prepared comprising a source of brewed coffee or tea and a receptacle positioned therebelow for collecting the coffee or tea as it is being brewed the improvement comprising a filter-like device positioned between the source of brewed coffee or tea and said receptacle for removing by coalescing coffee bean oils and oil-like hydrocarbons from the brewed coffee or tea, said filter-like device including a fabric member formed of synthetic fiber having exposed opposite surfaces containing exposed fibers, means mounting the filter-like device including means forming an enclosure with an upper surface of the device onto which a quantity of brewed coffee or tea can temporarily accumulate as it waits to pass through the device by gravity, the exposed fibers on said upper surface being brushed and sheared to form a fiber nap thereon of fine denier fibers whereby when the fabric member is wetted with brewed coffee or tea to be coalesced the fiber nap operates to retain and coalesce on the napped surface thereof the coffee bean oils and oil-like hydrocarbons contained in the brewed coffee or tea passing therethrough and without substantial accumulation of the brewed coffee or tea while permitting the brewed coffee or tea to pass through into the receptacle.

2. In the assembly of claim 1 the improvement wherein the fabric member is formed of fine denier fiber face yarns having interstitial openings formed by and between adjacent yarns whose largest dimensions are from 0.15 mm to 0.72 mm (0.006 to 0.028 inch).

3. In the assembly of claim 1 the improvement wherein the filter-like device includes a frame member for engaging and supporting the fabric member, said frame member including cooperatively engageable ring members, adapted to be engaged with each other and with a peripheral portion of said fabric member compressed therebetween.

4. In the assembly of claim 3 the improvement wherein said frame member has a handle portion.

5. In the assembly of claim 1 the improvement wherein the filter-like device includes framing means for engaging and supporting said fabric member, said framing means including a handle portion, a depending funnel-shaped wall portion defining an opening to expose a portion of said fabric member, and a locking ring adapted to retain a portion of said fabric member in said funnel-shaped portion such that the exposed portion of said fabric member extends unsupported across a space defined by the opening.

6. An assembly for removing oils from brewed coffee comprising a source of brewed coffee, a separate container for receiving the brewed coffee and a filter-like device through which the brew coffee passes as it moves from the source to the container, said filter-like device including a synthetic fabric filter-like member having opposite exposed surfaces, at least one of which surfaces is napped by having the relatively fine denier fibers which form said surface brushed and sheared, said one surface being the upper surface when device is in use, and said fabric filter-like member being formed of relatively fine denier fiber yarns constructed to form interstitial openings between adjacent yarn strands which openings have their largest dimension between 0.15 mm and 0.762 mm (0.006 to 0.028 inch) whereby when brewed coffee containing coffee bean oils and other undesirable oils and oil-like hydrocarbons to be removed is poured into the upper napped surface of the fabric filter-like member, the nap thereon will trap such oils and oil-like hydrocarbons and prevent them from passing therethrough while at the same time permitting the rest of the brewed coffee substantially unrestricted passage therethrough into said separate container positioned therebelow without substantial coffee accumulation on the filter-like member.

7. The assembly of claim 6 wherein said filter-like device includes framing means mounting the filter-like member and forming an enclosed space on the side thereof associated with the napped surface where brewed coffee can accumulate temporarily on said napped surface as it passes through the filter-like member, said framing means having a handle portion.

8. The assembly of claim 7 wherein said framing means is constructed of food grade nylon.

9. The assembly of claim 6 wherein said fabric filter-like member is formed of relatively low moisture regain synthetic fibers comprised of nylon, polyester, polyolefin or polyacrylic fibers and comprises a knitted, woven or nonwoven fabric.

10. The assembly of claim 6 wherein said fabric filter-like member is a nylon tricot Rasche knit fabric.

11. The method of removing substantially all of the oils and undesirable oil-like hydrocarbons from brewed coffee or tea comprising the steps of passing liquid brewed coffee or tea from a source thereof onto and through a filter-like device positioned below said source, the filter-like device including a synthetic porous fabric filter-like member formed by adjacent strands of yarn and having opposite exposed surfaces, at least one of said opposite surfaces being napped by brushing and shearing the fibers which form said surface, the fabric which forms said one surface being an upper surface when said filter-like device is being used and being formed of relatively fine denier fiber yarns constructed so as to form intestitial openings between adjacent strands which openings have their largest dimension between 0.15 mm and 0.72 mm (0.006 to 0.028 inch) so as to coalesce and trap oils and oil-like hydrocarbons on said napped under surface and prevent said oils from passing therethrough while permitting the rest of the brewed coffee or tea unrestricted passage therethrough into a container therebelow.

* * * * *